United States Patent Office 3,758,343
Patented Sept. 11, 1973

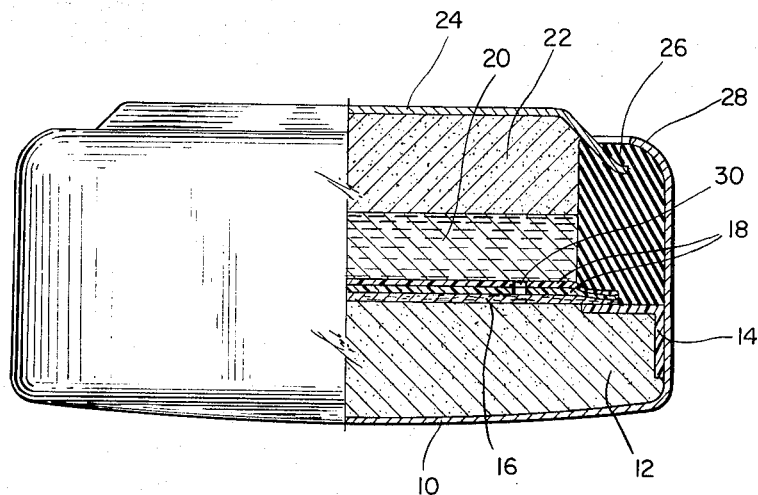
Fig. 1
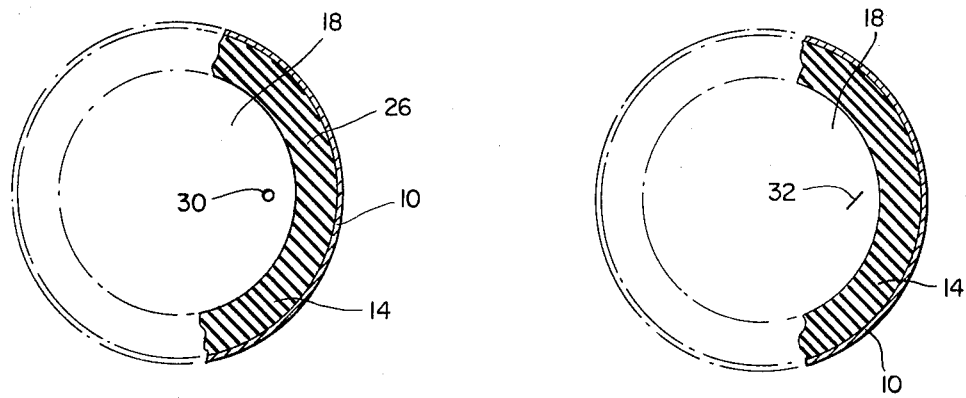
Fig. 2
Fig. 3

3,758,343
SILVER ZINC BUTTON CELL
Steven A. Magritz, Madison, Wis., assignor to
ESB Incorporated
Filed Mar. 22, 1972, Ser. No. 236,848
Int. Cl. H01m 3/04
U.S. Cl. 136—111          4 Claims

ABSTRACT OF THE DISCLOSURE

A silver oxide zinc cell is described having dual separation comprising an absorbent mat placed adjacent the silver oxide cathode and a semipermeable membrane barrier adjacent the anode. The cell is distinguished in having an opening through the semipermeable membrane barrier. The purpose of the opening in the barrier is to permit equalization of gas pressure between the cathode side of the barrier and the anode side.

BACKGROUND OF THE INVENTION

Field of the invention

This invention relates to primary galvanic cells of the button type. Specifically it relates to separation means for use in miniature silver zinc primary cells.

Description of the prior art

In a certain class of galvanic cells one or more of the current producing components have at least a slight solubility in the eelctrotyte. This differentiates the cells from the more numerous types of cell in which the cell chemicals are insoluble in electrolyte. The dissolved product of the first class of cell can and often does form a conductive path between the electrodes of the cell which results in premature failute.

It is well known that a semi-permeable membrane placed between positive and negative electrodes will contain the soluble ion and prevent the short circuiting of the battery.

The silver zinc couple is particularly susceptible to interelectrode shorting since both the zinc and the silver tend to dissolve and ionize in the caustic electrolyte of the system.

The use of a dual separator system in silver-zinc primary and secondary cells is well known. It is usual to place an absorbent or felted material next to the silver oxide cathode to provide an electrolyte reservoir. It is also desirable to locate a semipermeable membrane such as regenerated cellulose (cellophane or sausage casing) barrier between the felted material and the anode. The purpose of the barrier is to prevent migration of colloidal silver from cathode to anode and prevent zinc from forming dendrites from anode to cathode.

A certain type of silver-zinc primary cell has been found to be particularly advantageous for hearing aid use. This cell is of the "button" type. The cell is assembled in a low cylindrical metal container. The electrodes comprise for example, discs of pressed silver oxide and zinc powder with separation means between. The separation means may comprise discs of absorbent material, cellophane, etc. as described above. A metallic cover is used to close up and seal the cell. In many designs the edges of the separator discs are firmly nipped between the edges of an electrode and the cell sealing gasket. This is desirable construction as it provides reliable positioning of the separator system and prevents shorts from occurring at the periphery of the electrode buttons.

As with other silver-zinc cells a caustic potash solution is used as electrolyte. Unfortunately, it has been found that these small cells have a fault. After sealing, gas develops in the cathode compartment and collects as a bubble between cathode and separator system. This in turn reduces the available ionic current path between cathode and anode, increasing the cell impedance and reducing its total electrical capacity particularly at high rates of discharge. The gas does not appear in the cell immediately. It may take up to a month or so before the gas evolution ceases. Therefore, for proper inspection for this fault cells must be held in storage for a month or so prior to shipment which is an inconvenience to the manufacturer. The origin of the gas appears to be a combination of mix porosity, gas absorbed in the mix, and possibly gas formed when the electrolyte first touches the cathode mix. Means for removing the gas which would be quite acceptable for large open cells such as vibration, vacuum treatment, etc. are not suitable for use with small sealed button type primary cells made on production basis. In typical production runs, the reject rate due to the gas bubbles has been found to run as high as 20% or more.

SUMMARY OF THE INVENTION

A button type primary cell is assembled having a layer of felt material placed against the cathode and a semipermeable membrane barrier next to the anode. A discontinuity such as a hole or slit is provided through the barrier. The discontinuity permits the internal gases to equalize on each side of the barrier maintaining proper electrolyte contacts.

It has been found that if the felt material alone is used as separation, silver migration occurs resulting in a short circuited element. If the semipermeable barrier is used alone the gas bubbles are retained and a poor product ensues. If the semipermeable membrane barrier is punctured the gas bubbles escape but silver migration and shorting also occur. However, with the felt material in combination with the punctured barrier, the gas bubbles will disspite yet silver migration is held in check. The use of the punctured barrier with a felt absorbent had reduced the rejection rate from around 20% of production to about 0.3%.

BRIEF DESCRIPTION OF THE DRAWINGS

FIG. 1 depicts in elevation a partial cross section of a typical silver zinc cell making use of the invention.

FIG. 2 depicts a plan section cell embodying the invention.

FIG. 3 depicts in plan section a second embodiment of the invention.

DESCRIPTION OF THE PREFERRED EMBODIMENTS

Metal cell container 10 in FIG. 1 contains a pellet of cathode mix 12. A retainer support ring 14 encloses the periphery of the cathode pellet. A separator means dividing the cell into an anode compartment and a cathode compartment comprising a layer of felted absorbent material 16 made from cotton, rayon, nylon, polyester, or other fiber is located adjacent to the cathode mix. Above this is placed a barrier for example, two layers of glycerine free cellophane or a layer of sausage casing, to form a semipermeable membrane and complete the separator means. Above the separator means is found a layer of electrolyte 20 absorbed in a felted sponge and a layer of zinc powder 22. A cover member 24 encloses the cell and is sealed to the container 10 by means of a sealing gasket 26. In practice, the sealing gasket is compressed between the support ring 14 and the lip 28 of container 10. The compression of the gasket also puts pressure on the edge of the separator means, sealing it against the migration of metallic ions from the anode compartment to the cathode compartment and vice versa.

A discontinuity, in this case hole 30, is purposely made in the membrane 18. The form of the discontinuity is not critical. It can be a small hole punched through the cellophane or it may be a torn hole such as would be made by a pin puncture. Alternatively, it can be a slit cut through the cellophane sheet or sheets. FIG. 2 shown in plan section a cell similar to FIG. 1 opened to expose the cellophane membrane. As in FIG. 1, 10 represents the container, 14 represents the retainer suport, and 18 represents the semipermeable membrane barrier. A hole, 30 is shown punched through the barrier 18. FIG. 3 shows a cell similar to that of FIG. 2 having a slit 32 cut in the barrier. A torn hole or slit is preferred to the cut hole as the former tends to close up after the pressure is released whereas a cut hole will remain open. The size of the hole is not critical, however, it should be small, roughly the range of 1/16 inch to 1/64 inch in diameter.

It is found that gases collecting between the cathode pellet and the separator means in the cathode compartment is at a somewhat higher pressure than the electrolyte in the anode compartment. The pressure differential is sufficient to force gas through the opening in the barrier until the pressures are equalized. With the pressures equalized, the separator means is not separated from the cathode surface by a layer of gas but rests firmly on the cathode, providing good ionic contact and low and predictable impedance for the cell. The gas bubbles tend to migrate to areas distant from the barrier where they no longer are a detriment to cell action.

In a typical lot of cells built making use of the absorbent mat and cellophane barrier means with a hole through the cellophane, the rejects were about 0.3%. This compares with the 20% rejects found in the cells without these above features as recited above.

Although the above description is directed to a silver zinc primary button cell, the use of the perforated separation in other cell systems is considered to be a part of the invention.

Having fully described my invention, I hereby claim:

1. In a primary type galvanic cell comprising a container and cover with a cathode, an anode, separator means and electrolyte contained therein, the separator means comprising a first layer of porous material and a second layer comprising a semipermeable membrane barrier the improvement which comprises a discontinuity in the semipermeable membrane barrier.

2. A galvanic cell as defined in claim 1 wherein the active ingredient of the anode is zinc and the active ingredient of the cathode is silver oxide.

3. A galvanic cell as defined in claim 1 wherein the discontinuity in the barrier is a hole cut therein.

4. A galvanic cell as defined in claim 1 wherein the discontinuity in the barrier is a slit cut therein.

References Cited
UNITED STATES PATENTS

| 3,457,117 | 7/1969 | Angelovich | 136—111 |
| 2,877,285 | 3/1959 | Kempf | 136—111 |

FOREIGN PATENTS

| 966,898 | 10/1950 | France | 136—111 |

DONALD L. WALTON, Primary Examiner

U.S. Cl. X.R.

136—145